(12) United States Patent
Nyberg et al.

(10) Patent No.: US 8,311,002 B2
(45) Date of Patent: Nov. 13, 2012

(54) SCHEDULING OF USERS ON A SHARED RADIO RESOURCE USING A COMBINATION OF LINK QUALITY AND TRAFFIC INFORMATION

(75) Inventors: Henrik Nyberg, Stockholm (SE); Birgitta Olin, Bromma (SE); Nicholas Debernardi, Montrouge (FR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 639 days.

(21) Appl. No.: 12/440,657

(22) PCT Filed: Mar. 30, 2007

(86) PCT No.: PCT/SE2007/050201
§ 371 (c)(1),
(2), (4) Date: Dec. 11, 2009

(87) PCT Pub. No.: WO2008/036030
PCT Pub. Date: Mar. 27, 2008

(65) Prior Publication Data
US 2010/0085923 A1 Apr. 8, 2010

(30) Foreign Application Priority Data
Sep. 19, 2006 (SE) ........................................ 0601931

(51) Int. Cl.
*H04W 4/00* (2009.01)
*H04J 3/06* (2006.01)
(52) U.S. Cl. ........................................ 370/329; 370/508
(58) Field of Classification Search ........................ None
See application file for complete search history.

(56) References Cited

U.S. PATENT DOCUMENTS

| 2004/0179493 A1 | 9/2004 | Khan |
| 2005/0281278 A1 | 12/2005 | Black et al. |
| 2007/0025398 A1* | 2/2007 | Yonge et al. ............... 370/508 |

OTHER PUBLICATIONS

International Search Report dated Feb. 4, 2008 (4 pages).
International Preliminary Report on Patentability dated Nov. 14, 2008 (6 pages).
Andrews, M. et al., "*Providing Quality of Service Over a Shared Wireless Link*", Communications, 2001, IEEE International Conference, vol. 39, No. 2, Feb. 2001, pp. 150-154.
Cuomo, B.F. et al., "*Joint Channel and Traffic Adaptive Packet Scheduling Over Multiacces Radio Interfaces*", Communications, 2001, IEEE International Conference, ICC 2001, vol. 9, Part I, Feb. 2001, pp. 2872-2876.

* cited by examiner

*Primary Examiner* — John Blanton
(74) *Attorney, Agent, or Firm* — Myers Bigel Sibley & Sajovec, P.A.

(57) ABSTRACT

The present invention relates to a method and an arrangement for optimizing radio resource utilizations when scheduling data transmissions between a radio base station (15) and one or more user equipments (18) on a radio channel over a radio interface in a communication network comprising a plurality of said radio base stations (15) serving cells between which said user equipments (18) are moving. Firstly information on channel quality of said radio channel is obtained. Also, information on the traffic per user within the cell is obtained. Then, the information on channel quality and said traffic information are combined and the data transmission is scheduled based on the combination.

14 Claims, 8 Drawing Sheets

SCHEDULING OF USERS ON A SHARED RADIO RESOURCE USING A COMBINATION OF LINK QUALITY AND TRAFFIC INFORMATION

TECHNICAL FIELD

The present invention relates to a method and an arrangement in a communication network and, in particular to an arrangement allowing for optimizing radio resource utilization when scheduling data transmission as well as a method for such optimization. The invention further relates to a radio base station comprising such an arrangement and to a computer-readable medium containing computer program for optimizing such radio resource utilization.

BACKGROUND OF THE INVENTION

Efficient sharing of a resource in a radio access network (e.g. time-slots in GSM/EDGE, codes and power in WCDMA) can be obtained by a scheduling function that assigns and reassigns resources among a multitude of connections. Important examples of such scheduling functions are the schedulers used in radio base stations with High Speed Downlink Packet Access (HSDPA).

Access to a shared channel such as High Speed Downlink Shared Channel (HS-DSCH) in HSDPA is handled in the radio base station by the scheduling function. At each scheduling instant, resources necessary to transmit data over the shared channel are temporarily assigned to one or a few users. The scheduling decision, i.e. which users to select, at each instant is typically based on current user specific information such as delay (since last transmission) and radio link quality. A well-known method is proportional fair (PF) scheduling that achieves good performance by utilizing temporal link quality variations (multi-user diversity) while maintaining fairness in the sense of round robin (RR) scheduling.

In scenarios where file transfer, i.e. file download or file upload, is a common user service, there may be users with very large downloads. These users will need resources for a relatively long time, in particular if they in addition have a radio link with low bit-rate. For standard scheduling methods, such users might have significant impact on the performance experienced by other users. Thus, it is desirable to identify such users and take their specific demands into account when making the scheduling decisions.

Previously known scheduling methods designed to handle large files, such as the foreground-background (FB) scheduler and the shortest remaining processing time (SRPT), take the number of bits into account. However, these methods imply the problem that they do not utilize multi-user diversity and are therefore less suitable for a radio channel.

SUMMARY OF THE INVENTION

Accordingly, it is an objective with the present invention to provide an improved method of optimizing radio resource utilization when scheduling data transmissions between a radio base station and one or more user equipments on a radio channel over a radio interface in a communication network comprising a plurality of said radio base stations serving cells between which said user equipments are moving.

According to a first aspect of the present invention this objective is achieved through a method as defined below, which specifies that radio resource utilization is optimized by performing the steps of: obtaining information on channel quality of said radio channel; obtaining information on the traffic per user within the cell; combining said information on channel quality and said traffic information; and, scheduling said data transmission based on said combination.

Another objective with the present invention is to provide an improved arrangement for optimizing radio resource utilization when scheduling data transmissions between a radio base station and one or more user equipments on a radio channel over a radio interface in a communication network comprising a plurality of said radio base stations serving cells between which said user equipments are moving.

According to a second aspect of the present invention this objective is achieved through an arrangement as defined below, which specifies that radio resource utilization is optimized by an arrangement comprising: means for obtaining information on channel quality of said radio channel; means for obtaining information on the traffic per user within the cell; means for combining said information on channel quality and said traffic information; and, a scheduler arranged to schedule said data transmission based on said combination.

A further objective with the present invention is to provide an improved radio base station for optimizing radio resource utilization when scheduling data transmissions between a radio base station and one or more user equipments on a radio channel over a radio interface in a communication network comprising a plurality of said radio base stations serving cells between which said user equipments are moving.

According to a third aspect of the present invention this further objective is achieved through a radio base station as defined below, which specifies that radio resource utilization is optimized by a radio base station comprising an arrangement comprising: means for obtaining information on channel quality of said radio channel; means for obtaining information on the traffic per user within the cell; means for combining said information on channel quality and said traffic information; and, a scheduler arranged to schedule said data transmission based on said combination.

A yet further objective with the present invention is to provide an improved computer-readable medium containing computer program for optimizing radio resource utilization when scheduling data transmissions between a radio base station and one or more user equipments on a radio channel over a radio interface in a communication network comprising a plurality of said radio base stations serving cells between which said user equipments are moving.

According to a fourth aspect of the present invention this objective is achieved through a computer-readable medium as defined below, which specifies that radio resource utilization is optimized by a computer program which performs the steps of: obtaining information on channel quality of said radio channel; obtaining information on the traffic per user within the cell; combining said information on channel quality and said traffic information; and, scheduling said data transmission based on said combination.

Further embodiments are listed in the dependent claims.

Thanks to the provision of a method and an arrangement, which use a combination of channel quality information and traffic information when scheduling the data transmissions, the impact of large file transfers on the overall performance is reduced while the benefits of multi-user diversity still is provided. Also, a method and an arrangement for predicting the remaining service demand (e.g. number of bits to transfer) may, with or without the combination of channel quality information and with or without explicit quality of service indicators, be used for quality of service differentiation between users with different demands.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

Figure 1:
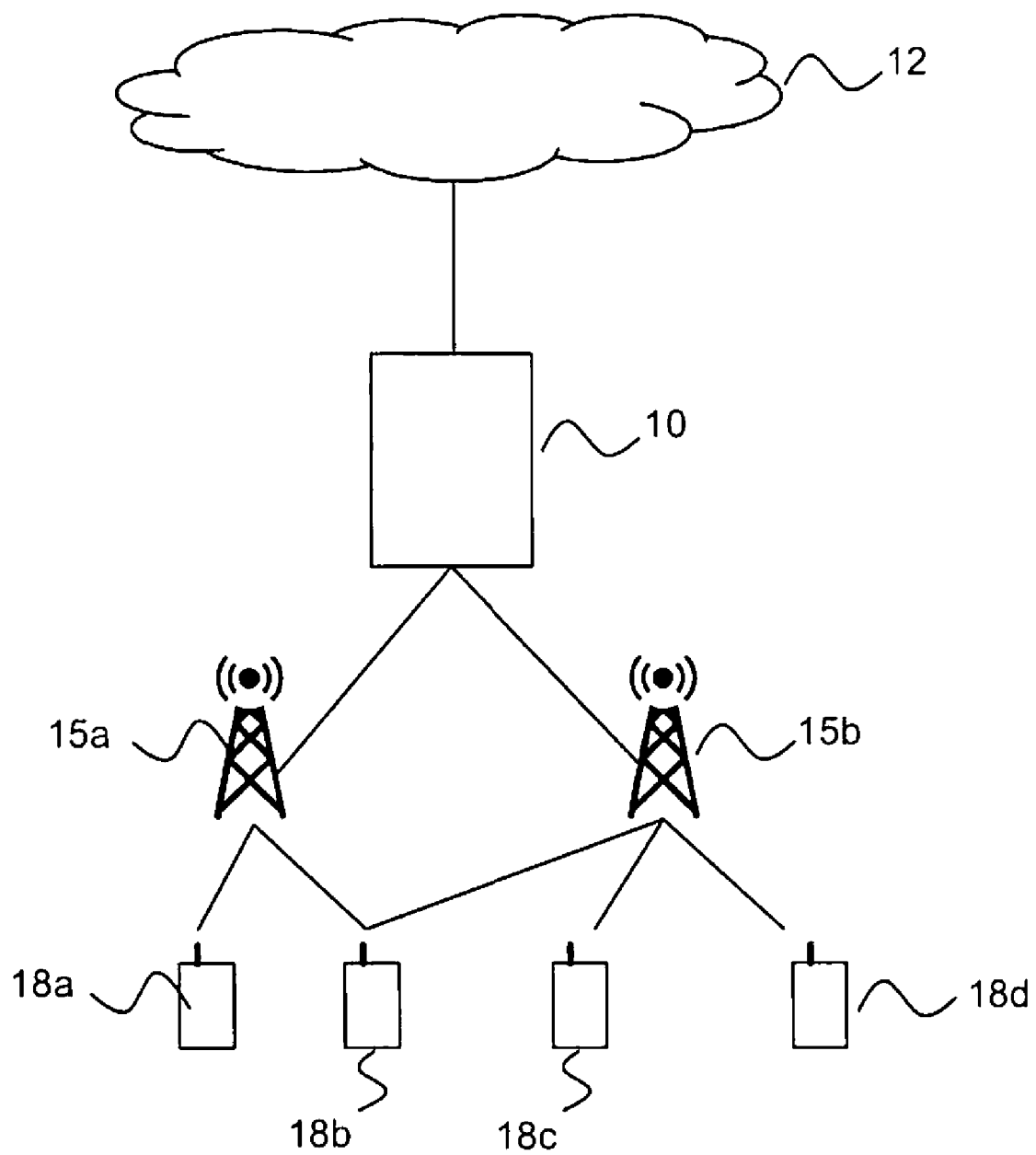
FIG. 1 shows an example of a communication network architecture.

FIG. 1 depicts a communication system, such as a Wideband Code Division Multiple Access (WCDMA) system, including a Radio Access Network (RAN), such as the UMTS Terrestrial Radio Access Network (UTRAN) architecture, comprising at least one Radio Base Station (RBS) (or Node B) 15a-b, connected to one or more Radio Network Controllers (RNCs) 10 (only one shown in FIG. 1). The RAN is connected over an interface such as the Iu-interface to a Core network (CN) 12, which may be a connection-oriented external CN such as the Public Switched Telephone Network (PSTN) or the Integrated Services Digital Network (ISDN), and/or a connectionless external CN as the Internet.

The RAN and the CN 12 provide communication and control for a plurality of user equipments (UE) 18a-d. The UEs 18 each uses downlink (DL) channels (i.e. base-to-user or forward) and uplink (UL) channels (i.e. user-to-base or reverse) to communicate with at least one RBS 15 over a radio or air interface.

According to a preferred embodiment of the present invention, the communication system is herein described as a WCDMA communication system. The skilled person, however, realizes that the inventive method and arrangement work very well on all communications system, such as the Global System for Mobile communications (GSM) or Long Term Evolution (LTE) system. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

The present invention applies, e.g., to wireless packet data systems providing multiple access over a shared channel. It is an object of the present invention to offer a way to take into consideration the traffic characteristics by including the remaining, partially unknown, download demands of different users in the scheduling function that makes it possible to improve the performance, in particular useful for scenarios where a mix of small and very large file downloads might occur.

The present invention relates to a scheduling method that reduces the impact of large file transfers on the overall performance while still providing the benefits of multi-user diversity. The scheduling method is based on remaining service time over the shared channel for each user. That requires knowledge about the size of the files that users request. In case that such information is not available for the scheduler, the scheduler uses estimated (i.e. predicted) file sizes based on the number of bits that have been transmitted so far. In case of a multi-service scenario where a subset of the users download a file, while other users use conversational or streaming services, the scheduler in addition uses service class information for each user connection.

The proposed scheduling is based on the following components:

A general model that splits the total number of bits of a user download into three parts: downloaded bits (known). known number of bits remaining and unknown number of bits remaining to transfer.

A score function using current link quality and traffic information to rank users.

A method to inform the scheduler about the remaining number of bits (optional, incomplete information possible).

A method to estimate remaining number of bits per user.

Figure 2:
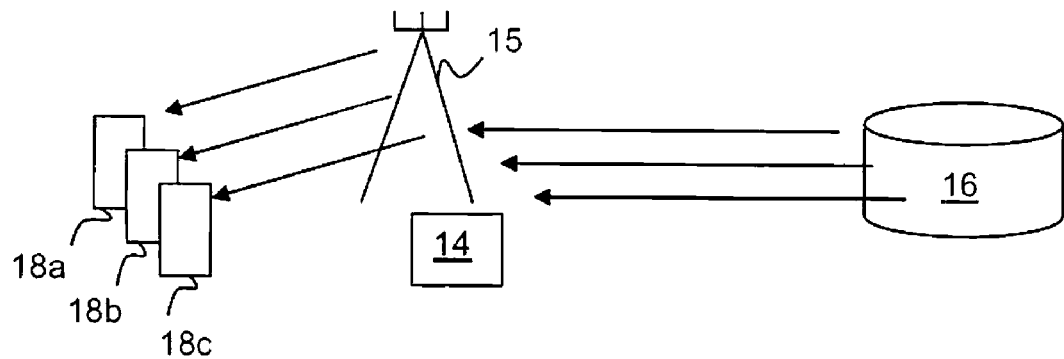
FIG. 2 shows a communication network according to a preferred embodiment of the present invention.

FIG. 2 shows a communication network system according to a first preferred embodiment of the present invention The system considered comprises a set of servers 16 (only one shown in FIG. 2), a set of users 18 and communication paths (shown with arrows) between the users 18 and servers 16. At least a part of each path consists of a common wireless radio channel providing multiple access using a scheduling function as can be seen in FIG. 2. The users 18 request file downloads from one or a number of servers 16. A scheduler 14 controls, by means of the scheduling function, the sharing of the wireless channel shared by the file downloads.

Let t=1, 2, . . . be transmission instants for the shared channel. Associated with each transmission instant is a scheduling decision. The scheduling function consists of a score function s(u,t) that for each transmission instant t ranks users u=1, 2, . . . , n(t) if there are n(t) users requesting service. The scheduling function also has a decision function:

$$d(s(1,t),s(2,t),\ldots,s(n(t),t)) \quad (1)$$

that selects a user based on their score values. Typically, the user with highest score is chosen, i.e. user u* given by $$u^*(t)=\arg\max_u s(u,t) \quad (2)$$

In case of ties, i.e. if two or more users have the maximal score, one of them is selected by random drawing or some other method that selects a unique user.

In general, the score function regarded in this invention is a function f of available information on downloaded and pending number of bits, channel quality and possibly other information such as delay, user priorities etc, i.e.

$$s(u,t)=f(n_1(u,t),n_2(u,t),\hat{N}_3(u,t),q(u,t),o(u,t)) \quad (3)$$

where n(u,t) is the received number of bits, $n_2(u,t)$ is the known number of bits not yet received, $\hat{N}_3(u,t)$ is the estimate of the unknown number of remaining bits, q(u,t) represents the channel quality information available at time t for user u, and o(u,t) represents other possible scheduling information not covered by channel quality and number of bits. The quantity o(u,t) will be omitted in the following, but should be regarded as a possible extension. The channel quality information is in the following represented by the potential link bitrate.

A particular scheduling method suggested here is based on the score function:

$$s(u,t) = R(u,t) \cdot \left( \frac{1}{\bar{r}(u,t)} + \frac{\alpha}{\hat{B}(u,t)} \right) \quad (4)$$

where R(u,t) is the current potential link bitrate for user u. The potential link bitrate is typically based on recent measurement reports from the UE. The quantity $\bar{r}(u,t)$ is a filtered bitrate per user that can for example be given by:

$$\bar{r}(u,t) = (1-1/\tau) \cdot \bar{r}(u,t-1) + 1/\tau \cdot R(u,t-1) \quad (5)$$

in which τ is a positive constant ("filter time coefficient"). The quantity $\hat{B}(u,t)$ is the estimated (alternatively known) remaining number of bits. The parameter α in expression (4) is a weighting factor. The score function yields high scores to users that have a large potential bitrate relative the filtered bitrate (first term in (4), or have a small remaining service time $\hat{B}(u,t)/R(u,t)$ (second term in (4)). The second term makes the scheduler responsive to the traffic characteristics. In particular, the score takes the tail properties of the download file size distribution into account.

The method with the score function (4) is in the following denoted SRLST (shortest remaining logged sojourn time). In particular α=1 is a preferred setting.

Other settings of α that give more or less weight to the last term are possible and might be desirable depending on the characteristics of the traffic (QoS requirements, file size distribution). A small α means that the scheduler primarily takes the channel quality and fairness in the sense of proportional fairness (PF) into account. For instance, pure PF is obtained with α=0.

Figure 3:
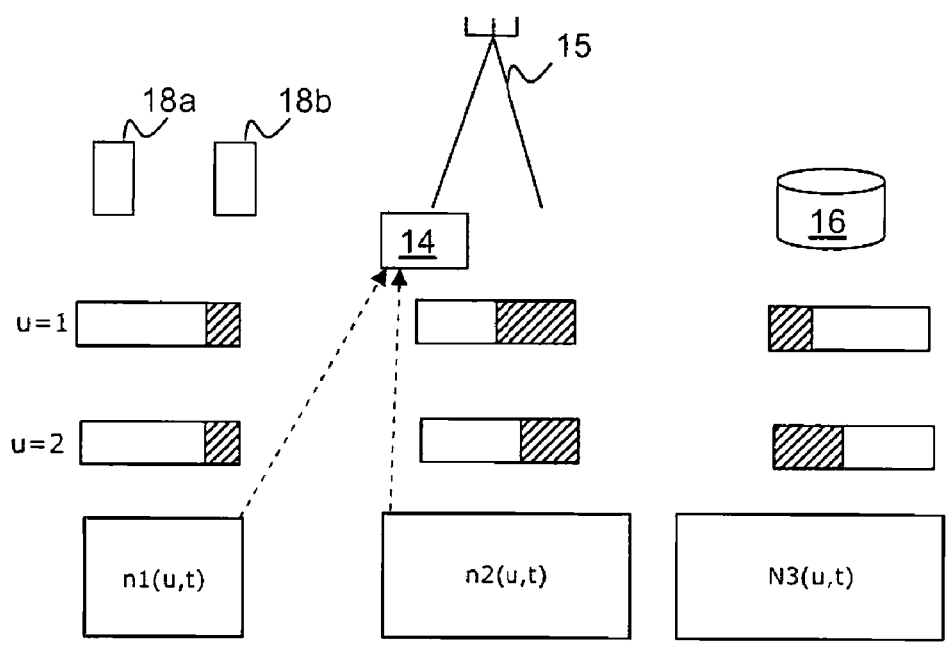
FIG. 3 illustrates a general inventive model of scheduling file downloads according to a first preferred embodiment of the present invention.

FIG. 3 shows an inventive general model according to a first preferred embodiment of the invention. The system considered comprises a set of servers 16 (only one shown in FIG. 3), a set of users 18a and 18b (two are shown in FIG. 3) and a radio base station 15 comprising a scheduler 14, which controls, by means of the scheduling function, the sharing of the wireless channel shared by the file downloads. At time t, a user u (two users are illustrated in FIG. 3) has received n1(u,t) bits, which is known by the scheduler (shown with an arrow). The RBS 15 is provided with functions for counting a number of acknowledged bits per user and this information is available for the scheduler 14. Also, the known number of bits waiting for transmission n2(u,t) is known by the scheduler 14, since the RBS 15 further is provided with functions for monitoring a buffered number of bits and, optionally, for communicating with other nodes, such as the RNC about how many number of bits stored per user there is. In case the remaining number of bits is partially unknown, it must be predicted based on the available information. Based on the model shown in FIG. 3, the number of remaining bits is estimated by:

$$\hat{B}(u,t) = n_2(u,t) + \hat{N}_3(u,t). \quad (6)$$

The number of bits that remains is estimated by (6) whereof N3(u,t) may be unknown for the scheduler 14. Note that the model also covers the extreme cases that the number of all remaining bits is either fully known or completely unknown. Assuming knowledge about the distribution function F of the file sizes (alt. requested number of bits per file transfer) in the network, the unknown total number of bits is predicted by the conditional expectation with respect to the file size distribution, given that the file size is larger than the known number of bits, $$\hat{B}(u,t) = E[X|X > n_1(u,t) + n_2(u,t)] - n_1(u,t). \quad (7)$$

The file size distribution is in general not known, but must be estimated from previous and possibly ongoing downloads. This can be done using a fully parametric model, e.g. a lognormal distribution with parameters to be fitted to the data, or a non-parametric approach, for instance based on the Kaplan-Meier estimator or similar methods known from literature on statistical methods. Updating of the estimated file size distribution can be done continuously, either by the maximum likelihood method or a Bayesian approach.

Figure 4:
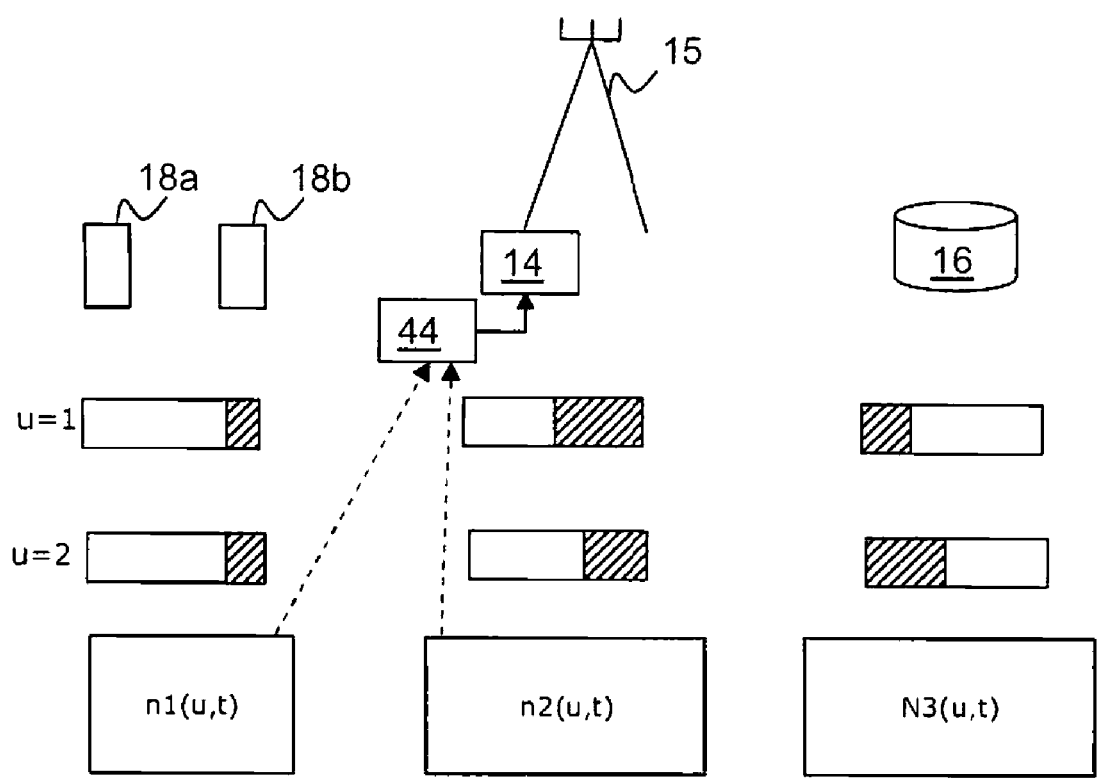
FIG. 4 illustrates how traffic information is collected according to a second preferred embodiment of the invention.

FIG. 4 shows how traffic information is collected according to a second preferred embodiment of the invention. The system considered comprises a set of servers 16 (only one shown in FIG. 4), a set of users 18a and 18b (two are shown in FIG. 4) and a radio base station 15 comprising a scheduler 14, which controls, by means of the scheduling function, the sharing of the wireless channel shared by the file downloads. The RBS 15 further comprises an estimator 44, which collects previous and current download information, uses this information to predict remaining number of bits per user and reports this further to the scheduler 14. At time t, a user u (two users are illustrated in FIG. 4) has received n1(u,t) bits, which is reported to the estimator 44 (shown with an arrow) for further transfer to the scheduler 14. Also, the known number of bits waiting for transmission n2(u,t) is reported to the estimator 44. In case the remaining number of bits is partially unknown, it must be predicted based on the available information.

For the parametric approach, it is important to note that the type of distribution that is fitted to the data is important for the behaviour of the scheduler. If the objective is to punish large downloads, a sub-exponential distribution such as lognormal distribution or Pareto distribution might be a good initial setting. As the amount of collected download statistics increases, the model might be refined.

File download is usually associated with interactive or background service classes, which means that the proposed scheduling method primarily targets such users.

For users of streaming or conversational services, the approach of scheduling with respect to remaining number of bits might be less suitable, and an alternative within the proposed framework is to use the same score function, but with the variable representing the remaining number of bits (e.g. B in the score function (4)) set to, for example, a constant, pre-determined, value. In particular, in mixed traffic scenarios where conversational and streaming traffic should have high priority, the number-of-bits variable could be set to a typical IP packet size for such a service.

It should be understood that the described method could be extended to an adaptive parameter setting (e.g. the parameter α in the score function (4)), depending on the current estimated distribution of the number of bits per download.

The method could also be extended to include more detailed information of the users based on e.g. file size distribution depending on user category, where a user category might be based on subscription type, service type, geographic location or some other classification. A database collecting relevant download statistics in the operator's network will then be useful as a source of information for the scheduler that handles traffic in a specific cell.

Figure 5:
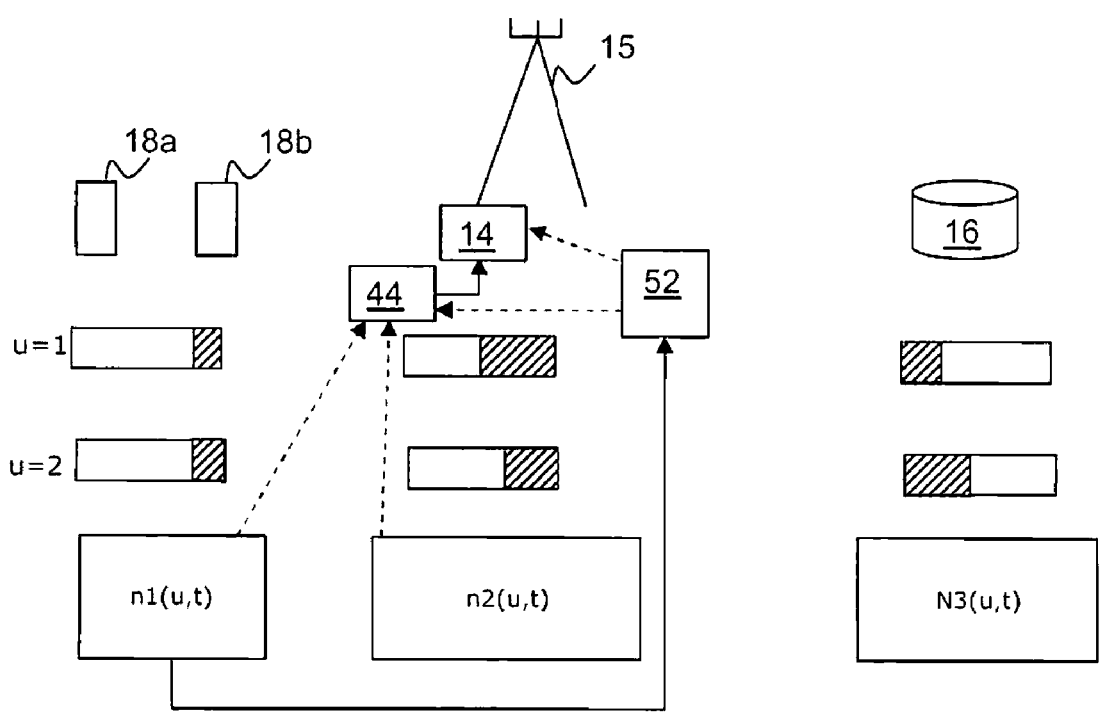
FIG. 5 shows how file size predictions are made more precise according to a third preferred embodiment of the invention

Thus, FIG. 5 shows how file size predictions are made more precise according to a third preferred embodiment of the invention. The system considered comprises a set of servers 16 (only one shown in FIG. 5), a set of users 18a and 18b (two are shown in FIG. 5) and a radio base station 15 comprising a scheduler 14, which controls, by means of the scheduling function, the sharing of the wireless channel shared by the file downloads. The RBS 15 further comprises an estimator 44, which collects previous and current download information, uses this information to predict remaining number of bits per user and reports this further to the scheduler 14. At time t, a user u (two users are illustrated in FIG. 4) has received n1(u,t) bits, which is reported to the estimator 44 (shown with an arrow) for further transfer to the scheduler 14. Also, the known number of bits waiting for transmission n2(u,t) is reported to the estimator 44. In case the remaining number of bits is partially unknown, it must be predicted based on the available information. The system further comprises a network database 52 that provides complementary information such as subscription information, application information, user classification based on previous traffic characteristics, in order to make file size predictions more precise in the estimator 44 and possibly to directly affect scheduling decisions in the scheduler 14. One advantage of such a data base would be to store traffic statistics and build up knowledge about the traffic demands of subscribers in the network.

For example, the information might be used to help the scheduler classify the user as a more or less probable heavy download user. This classification can be based on current information and collected information. Current information can be application information related to the data stream (for example the type of application protocol to identify the traffic type). Collected information can be statistics of previous download volumes of the user, or of a group of users to which the user is associated by e.g. subscription type. This user specific information, which is compared to data traffic volume statistics for all users in the operators network. A first classification can be the mean file size of the user compared to the mean file size for all users. If the mean for the user is well above the overall mean, the user is classified as heavy in the scheduling decision. A second classification is with respect to the uncertainty in predicting the user's download behavior. If the no or little statistics for the user is available, or if the variance of the downloaded file sizes is large, the user is classified as more or less predictable.

Based on the first and second classifications, the estimator 44 can now form a user adapted file size probability distribution to use as a basis for estimating the remaining number of bits. For example, the user adapted file size distribution $F_u(x)$ could be of the form $$F_u(x) = c_u \cdot H_u(x) + (1-c_u) \cdot H_{all}(x) \quad (8)$$

where $c_u$ is a coefficient between 0 and 1 that depends on the classification of user u, $H_u(x)$ is the file size distribution corresponding to downloads of user u and $H_{all}(x)$ is the distribution obtained from downloads of all users.

Figure 6:
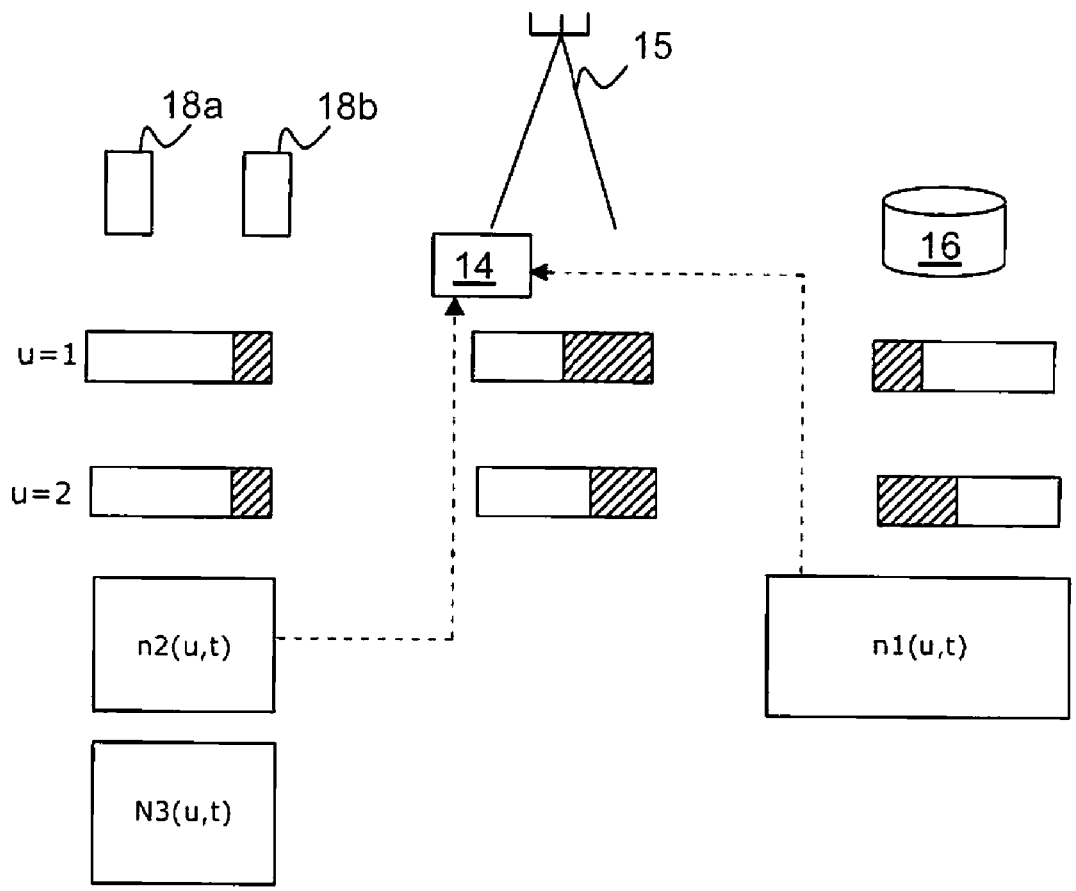
FIG. 6 illustrates a general inventive model of scheduling file uploads according to the first preferred embodiment of the present invention.

The file transfers discussed above are mainly file downloads. The invention works, however, very well on file uploads as well which is obvious for the person skilled in the art. Thus, FIG. 6 shows an inventive general model of scheduling file uploads according to the first preferred embodiment of the invention corresponding to the model of scheduling file downloads shown in FIG. 3. The system considered comprises a set of servers 16 (only one shown in FIG. 6), a set of users 18a and 18b (two are shown in FIG. 6) and a radio base station 15 comprising a scheduler 14, which controls, by means of the scheduling function, the sharing of the wireless channel shared by the file uploads. At time t, a user u (two users are illustrated in FIG. 6) has transmitted n1(u,t) bits, which is known by the scheduler (shown with an arrow). Also, the known number of bits waiting for transmission n2(u,t) is known by the scheduler 14. In case the remaining number of bits is partially unknown, it must be predicted based on the available information. Based on the model shown in FIG. 6, the number of remaining bits is estimated by equation (6).

Figure 7:
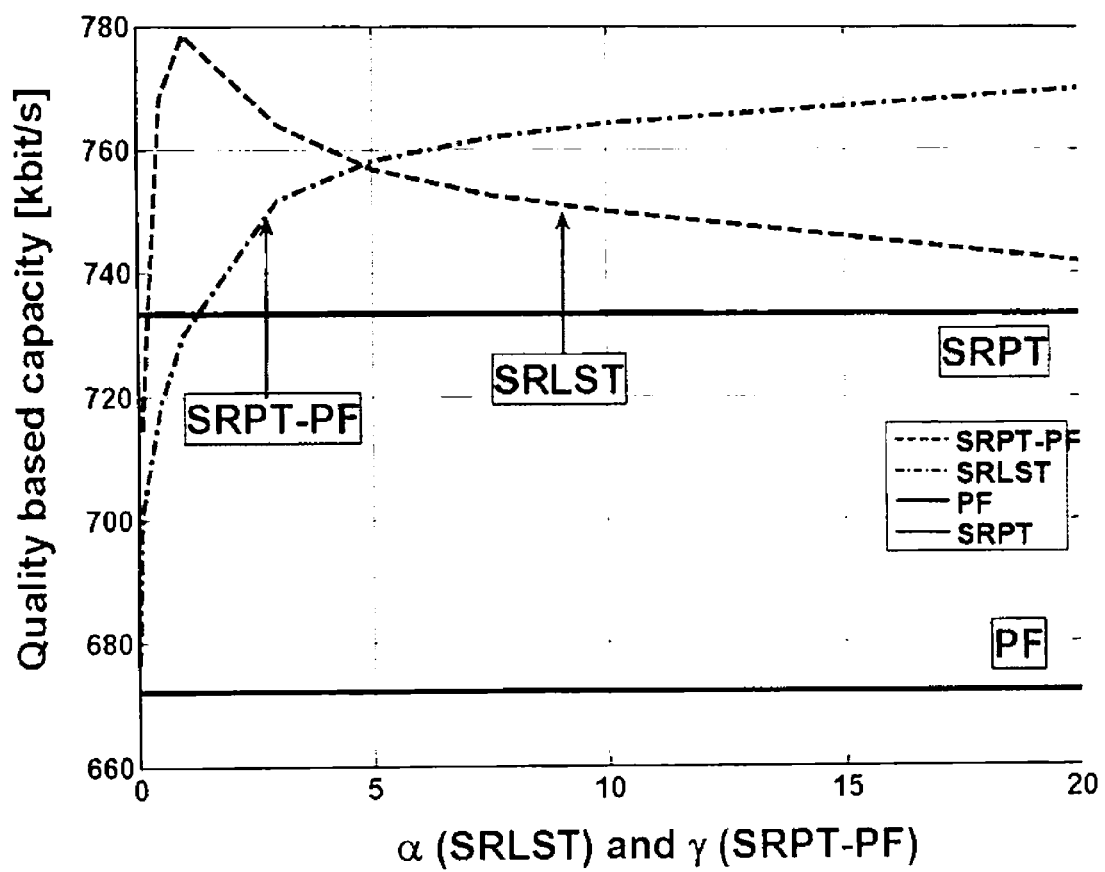
FIG. 7 is a diagram of quality based cell capacity for different schedulers, wherein the number of bits per download has a distribution with large variance.
Figure 8:
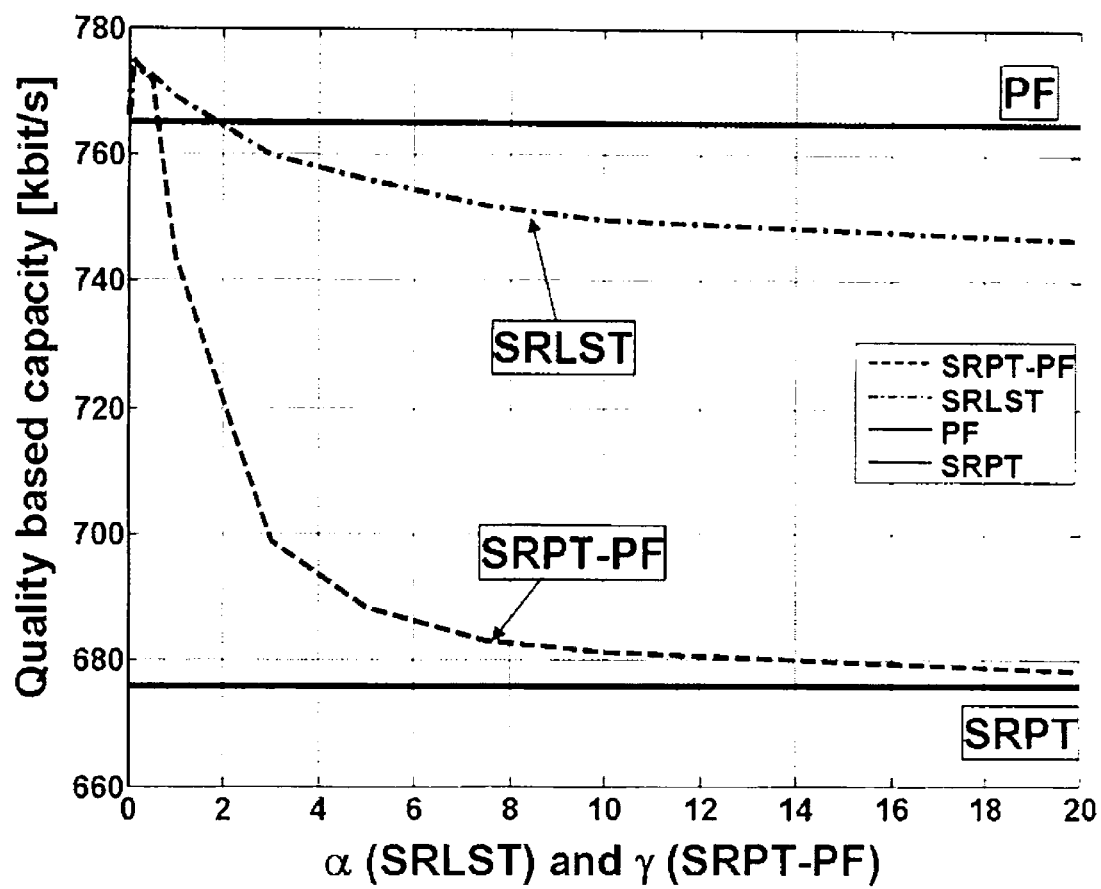
FIG. 8 is a diagram of quality based cell capacity for different schedulers, wherein the number of bits per download is fixed; and, FIG. 9 is an example of a computer-readable medium.

FIGS. 7-8 show examples of the estimated quality based cell capacity for different schedulers and various parameter settings in two different download scenarios. The schedulers that are compared are proportional fair (PF), shortest remaining processing time (SRPT), a combination of PF and SRPT (SRPT-PF) and shortest remaining logged sojourn time (SRLST) with score function (4). SRPT schedules the user with the shortest remaining service time (which is assumed known in this example). PF is proportional fair scheduling, i.e. channel quality based. SRPT-PF is a combination of SRPT and PF. SRPT-PF has a score function s(u,t) given by $$s(u, t) = \frac{R(u, t)}{\bar{r}(u, t) \cdot P(u, t)^\gamma} \quad (9)$$

in which R(u,t) is the potential bitrate of user u at time t, $\bar{r}$(u,t) is the filtered bitrate up to time t, for example given by equation (5), P(u,t) is the remaining processing time (i.e. transmission time over the radio interface) and γ is a parameter. The remaining processing time is usually unknown but can be estimated by $$\hat{P}(u,t) = \hat{B}(u,t) / \hat{R}_{mean}(u,t) \quad (10)$$

where $\hat{B}$(u,t) is an estimate of the remaining number of bits (see equation (6)) and $\hat{R}_{mean}$(u,t) is the estimated mean bitrate (during transmission) for user u.

In FIG. 7, quality based cell capacity for different schedulers and various parameter settings (x-axis) are shown. The number of bits per download has a distribution with large variance. The plot shows that for this traffic scenario, SRPT which takes traffic information into account, yields a higher capacity than PF which takes channel quality information into account. The plot also shows that even higher capacity is obtained for scheduling methods that take both traffic and channel quality into account (SRLST and SRPT-PF), in particular for a proper parameter setting. The plot also shows that for SRLST, α=1 yields a capacity maximum.

In FIG. 8, quality based cell capacity for different schedulers and various parameter settings (x-axis) are shown. The number of bits per download is fixed. The plot shows that for this traffic scenario, SRLST can provide a cell capacity that is equal to that provided by PF. SRPT is not designed for this traffic scenario and provides a significantly lower capacity than PF and SRLST. One important observation is that SRLST provides a high capacity for α=1, which was the best choice for the first traffic scenario. This robustness (against erroneous model assumptions) of SRLST is an advantage when the traffic characteristics in the network are unknown or vary much. The performance of SRPT-PF is more sensitive to the traffic scenario.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Figure 9:
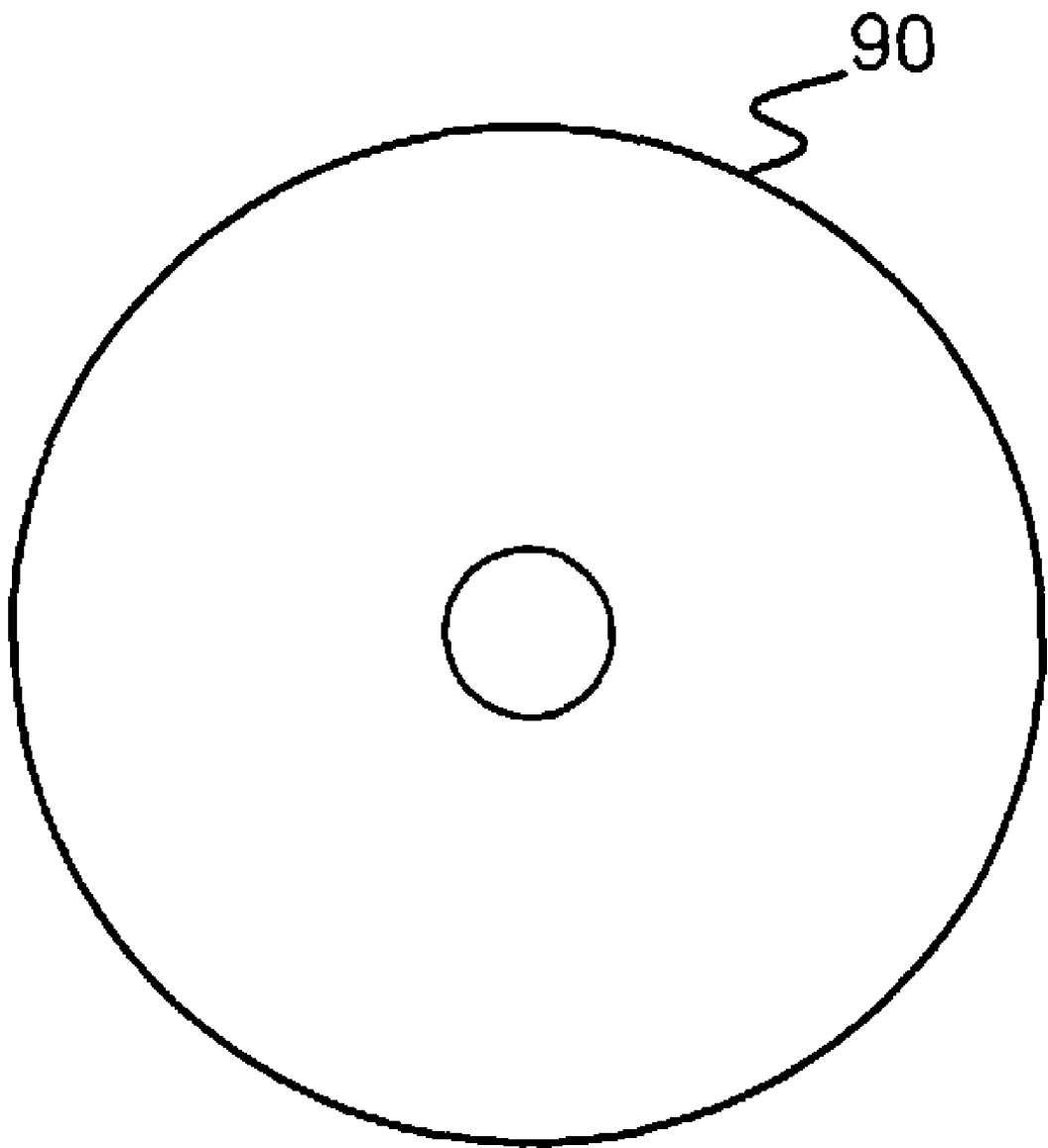

Moreover, the invention can additionally be considered to be embodied entirely within any form of computer-readable storage medium, an example of which is shown in FIG. 9 and denoted 90, having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" 90 can be any means that can contain, store, communicate, propagate, or transport the program for use by or in connection with the instruction-execution system, apparatus or device. The computer-readable medium 90 can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for optimizing radio resource utilization when scheduling data transmissions between a radio base station and one or more user equipments on a radio channel over a radio interface in a communication network comprising a plurality of said radio base stations serving cells between which said user equipments are moving, wherein the computer program performs the step of: obtaining information on channel quality of said radio channel; obtaining information on the traffic within the cell; combining said information on channel quality and said traffic information; and, scheduling said data transmission based on said combination.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of optimizing radio resource utilization when scheduling data transmissions between a radio base station and one or more user equipments on a radio channel over a radio interface in a communication network comprising a plurality of radio base stations that serve cells between which the one or more user equipments are moving, the method comprising:

obtaining information on channel quality of the radio channel;

obtaining information on traffic per user within a cell;

combining the information on channel quality and the information on traffic information per user;

predicting in number of bits a size of the data transmissions;

scheduling the data transmissions based on the combined information and the predicted size of the data transmissions; and splitting the number of bits into an already transmitted number of bits, a known number of bits remaining to transmit and an unknown number of bits remaining to transmit.

2. The method according to claim 1, where the information on channel quality is obtained by estimating a link bitrate of the radio channel for a specific user.

3. The method according to claim 1, where the information on traffic per user is traffic type information, that includes one or more of file transfer traffic, streaming traffic, or conversational traffic.

4. The method according to claim 1, further comprising:
estimating the unknown number of bits remaining to transmit from previous and ongoing data transmissions by using a parametric model of a probability distribution of a number of bits per data transmission.

5. A method of optimizing radio resource utilization when scheduling data transmissions between a radio base station and one or more user equipments on a radio channel over a radio interface in a communication network comprising a plurality of radio base stations that serve cells between which the one or more user equipments are moving, the method comprising:

obtaining information on channel quality of the radio channel;

obtaining information on traffic per user within a cell;

combining the information on channel quality and the information on traffic information per user;

predicting in number of bits a size of the data transmissions;

scheduling the data transmissions based on the combined information and the predicted size of the data transmissions; and using the information on traffic per user and subscription information provided by a database to classify each user in order to make file size predictions, and where the scheduling is based on the file size predictions.

6. A method of optimizing radio resource utilization when scheduling data transmissions between a radio base station and one or more user equipments on a radio channel over a radio interface in a communication network comprising a plurality of radio base stations that serve cells between which the one or more user equipments are moving, the method comprising:

obtaining information on channel quality of the radio channel;

obtaining information on traffic per user within a cell;

combining the information on channel quality and the information on traffic information per user;

predicting in number of bits a size of the data transmissions;

scheduling the data transmissions based on the combined information and the predicted size of the data transmissions; and using a score function when scheduling the data transmissions, where the score function is expressed as:

$$s(u, t) = R(u, t) \cdot \left( \frac{1}{\bar{r}(u, t)} + \frac{\alpha}{\hat{B}(u, t)} \right)$$

where,
$R(u,t)$ is a current potential link bitrate for user u;
$\bar{r}(u, t)$ is a filtered bitrate per user;
$\hat{B}(u, t)$ is a remaining number of bits to transmit; and
$\alpha$ is a weighting factor.

7. A system for optimizing radio resource utilization when scheduling data transmissions between a radio base station and one or more user equipments on a radio channel over a radio interface in a communication network comprising a plurality of radio base stations that serve cells between which the one or more user equipments are moving, the system comprising:
   means for obtaining information on channel quality of the radio channel;
   means for obtaining information on traffic per user within a cell;
   means for combining the information on channel quality and the information on traffic per user;
   means for predicting in number of bits a size of the data transmissions;
   a scheduler to schedule the data transmissions based on the combined information and the predicted size of the data transmissions; and
   means for splitting the bits into an already transmitted number of bits, a known number of bits remaining to transmit and an unknown number of bits remaining to transmit.

8. The system according to claim 7, where the means for obtaining information on channel quality obtains the information on channel quality by estimating a link bitrate of the radio channel for a specific user.

9. The system according to claim 7, where the information on traffic per user is traffic type information that includes one or more of file transfer traffic, streaming traffic, or conversational traffic.

10. The system according to claim 7, further comprising:
    means for estimating the unknown number of bits remaining to transmit from previous and ongoing data transmissions by using a parametric model of a probability distribution of a number of bits per data transmission.

11. A system for optimizing radio resource utilization when scheduling data transmissions between a radio base station and one or more user equipments on a radio channel over a radio interface in a communication network comprising a plurality of radio base stations that serve cells between which the one or more user equipments are moving, the system comprising:
    means for obtaining information on channel quality of the radio channel;
    means for obtaining information on traffic per user within a cell;
    means for combining the information on channel quality and the information on traffic per user;
    means for predicting in number of bits a size of the data transmissions;
    a scheduler to schedule the data transmissions based on the combined information and the predicted size of the data transmissions; and
    means for using the information on traffic per user and subscription information provided by a database to classify each user in order to make file size predictions, and where the scheduler schedules based on the file size predictions.

12. A system for optimizing radio resource utilization when scheduling data transmissions between a radio base station and one or more user equipments on a radio channel over a radio interface in a communication network comprising a plurality of radio base stations that serve cells between which the one or more user equipments are moving, the system comprising:
    means for obtaining information on channel quality of the radio channel;
    means for obtaining information on traffic per user within a cell;
    means for combining the information on channel quality and the information on traffic per user;
    means for predicting in number of bits a size of the data transmissions;
    a scheduler to schedule the data transmissions based on the combined information and the predicted size of the data transmissions; and
    means for using a scoring function when scheduling the data transmissions, where the scoring function is expressed as:

$$s(u, t) = R(u, t) \cdot \left( \frac{1}{\bar{r}(u, t)} + \frac{\alpha}{\hat{B}(u, t)} \right)$$

where,
$R(u,t)$ is a current potential link bitrate for user u;
$\bar{r}(u, t)$ is a filtered bitrate per user;
$\hat{B}(u, t)$ is a remaining number of bits to transmit; and
$\alpha$ is a weighting factor.

13. A radio base station for optimizing radio resource utilization when scheduling data transmissions between the radio base station and one or more user equipments on a radio channel over a radio interface in a communication network comprising a plurality of radio base stations that serve cells between which the one or more user equipments are moving, the radio base station comprising:
    means for obtaining information on channel quality of the radio channel;
    means for obtaining information on traffic per user within a cell;
    means for combining the information on channel quality and the information on traffic per user;
    means for predicting in number of bits a size of the data transmissions;
    means for scheduling the data transmissions based on the combined information; and
    means for splitting the number of bits into an already transmitted number of bits, a known number of bits remaining to transmit and an unknown number of bits remaining to transmit.

14. A non-transitory computer-readable medium containing a computer program for optimizing radio resource utilization when scheduling data transmissions between a radio base station and one or more user equipments on a radio channel over a radio interface in a communication network comprising a plurality of radio base stations that serve cells between which the one or more user equipments are moving, where the computer program includes instructions for:

obtaining information on channel quality of the radio channel;

obtaining information on traffic per user within a cell;

combining the information on channel quality and the information on traffic information per user;

predicting in number of bits a size of the data transmissions;

scheduling the data transmissions based on the combined information and the predicted size of the data transmissions; and splitting the number of bits into an already transmitted number of bits, a known number of bits remaining to transmit and an unknown number of bits remaining to transmit.

* * * * *

UNITED STATES PATENT AND TRADEMARK OFFICE
CERTIFICATE OF CORRECTION

PATENT NO. : 8,311,002 B2
APPLICATION NO. : 12/440657
DATED : November 13, 2012
INVENTOR(S) : Nyberg et al.

It is certified that error appears in the above-identified patent and that said Letters Patent is hereby corrected as shown below:

On the Face Page, in Field (56), under "OTHER PUBLICATIONS", in Column 2, Line 8, delete "Multiacces" and insert -- Multiaccess --, therefor.

In Column 3, Line 26, delete "invention" and insert -- invention; --, therefor.

In Column 4, Line 29, delete "(known)." and insert -- (known), --, therefor.

In Column 4, Line 59, in Equation (2), delete "s(u,t)" and insert -- s(u,t). --, therefor.

In Column 5, Line 1, delete "n(u,t)" and insert -- $n_1(u,t)$ --, therefor.

In Column 10, Line 20, in Claim 3, delete "information," and insert -- information --, therefor.

In Column 11, Line 32, in Claim 7, delete "transmissions:" and insert -- transmissions; --, therefor.

Signed and Sealed this
Twelfth Day of March, 2013

Teresa Stanek Rea
*Acting Director of the United States Patent and Trademark Office*